United States Patent
Oberthuer

[11] 4,025,123
[45] May 24, 1977

[54] BRAKE FORCE REGULATOR FOR DUAL BRAKE CIRCUIT SYSTEM

[75] Inventor: Heinrich Oberthuer, Offenbach-Rumpenheim, Germany

[73] Assignee: ITT Industries, Inc., New York, N.Y.

[22] Filed: Dec. 2, 1975

[21] Appl. No.: 636,889

[30] Foreign Application Priority Data
Dec. 11, 1974 Germany .......................... 2458515

[52] U.S. Cl. .............................. 303/6 R; 60/550; 303/22 R
[51] Int. Cl.² ........................................ B60T 8/00
[58] Field of Search ............... 303/6 R, 6 C, 22 R, 303/50, 52; 137/87; 60/550

[56] References Cited
UNITED STATES PATENTS

| | | | |
|---|---|---|---|
| 3,138,410 | 6/1964 | Bueler | 303/52 |
| 3,449,018 | 6/1969 | Hales | 303/22 R |
| 3,669,505 | 6/1972 | Falk | 137/87 |
| 3,806,207 | 4/1974 | Reinecke et al. | 303/22 R |
| 3,941,427 | 3/1976 | Harries | 303/6 R |

*Primary Examiner*—Trygve M. Blix
*Assistant Examiner*—Edward R. Kazenske

*Attorney, Agent, or Firm*—John T. O'Halloran; Thomas M. Marshall

[57] ABSTRACT

The brake force regulator of this invention provides for genuine dual circuit control so that in the event of failure of one of the intact brake circuits, control of the other can be continued at an increased switching point pressure. The brake force regulator of this invention includes a pair of axially displaceable stepped pistons which make fluid connections to both brake circuits in the same manner. A control chamber is defined by both stepped pistons on the one hand and a control piston to which is applied to control force on the other. A fluid connection is provided between the control chamber and the brake circuit controlled by each stepped piston which is opened when the control piston approaches either of the stepped pistons. The faces of the stepped pistons to which is applied the pressure in the control chamber is smaller than the face of the control piston upon which the pressure in the control chamber acts in the opposite direction. When both brake circuits are intact, the control force is reduced since it acts on the stepped pistons in the opening direction of the brake force regulators by a predetermined hydraulic transmission ratio between the control piston and the stepped pistons.

10 Claims, 1 Drawing Figure

BRAKE FORCE REGULATOR FOR DUAL BRAKE CIRCUIT SYSTEM

FIELD OF THE INVENTION

Brake force regulators for dual circuit brake systems.

BACKGROUND OF THE INVENTION

Brake force regulators for dual circuit brake systems in both brake circuits are known as illustrated in the German unexamined patent application DT-OS No. 2,236,294. In the prior art brake force regulator, the regulated pressure of one brake circuit in front of the larger stepped-piston end is transferred to a closing member of a pressure reducer by means of a floating intermediate piston. This provides structure in which the regulated pressure of the brake circuit connected with the pressure reducer always follows the regulated pressure of the brake circuit connected with a brake force limiter only when both brake circuits are intact. Thus, the simple pressure reducer in each brake circuit operates as a brake force regulator only so long as both brake circuits are intact. However, if the brake circuit which includes the brake force regulator fails, the device of German unexamined patent application DT-OS No. 2,236,294, does not operate satisfactorily because no further brake pressure can be built up in the wheel cylinders connected to the pressure reducer when the single switching point has been reached.

When it is recognized that rear-axle brakes may also be designed to include dual circuit brakes, an increased or higher switching point with subsequent normal brake force regulation would be an extremely desirable feature.

It is known, as illustrated in German patent DT-OS No. 1,915,485, that a device can be provided which will combine two load-conscious brake-force limiters such that a genuine dual circuit design is maintained. This is achieved by a mechanical transfer of the axle-load determined control force, which predetermines the closing point from one brake force limiter to the other. Not only does the device illustrated in German patent DT-OS No. 1,915,485 not allow for any brake force regulation, it also does not make it possible to vary the closing point by a specific degree, which is predetermined by the design, if a brake circuit fails.

SUMMARY OF THE INVENTION

The device of this invention improves the brake force regulator of the type referred to in German unexamined patent DT-OS No. 2,236,294 to permit genuine dual circuit control so that, in the event of failure of one brake circuit, the control of the other intact brake circuit can be continued at an increased switching point pressure. In the preferred embodiment of this invention, there are first and second axially displaceable stepped pistons each of which has fluid connections to two independent brake circuits in the same manner. A control chamber is provided which is between both stepped pistons jointly and a control piston. The control piston has applied to it the braking control force. Thus, the control chamber is determined by both stepped pistons on the one hand and by the control piston on the other. A fluid connection between the control chamber and the brake circuit controlled by the first stepped piston is provided which fluid connection is opened when the control piston approaches either of the stepped pistons. The face of the stepped pistons to which is applied the pressure in the control chamber is smaller than the face of the control piston upon which the pressure in the control chamber acts in the opposite direction. In the device of this invention the two stepped pistons and the control piston are arranged coaxially with the smaller end portion of the first stepped piston projecting into said control chamber through a sealed bore in the second stepped piston in which said smaller end portion is slidingly mounted. A fluid connection between the control chamber and the brake circuit controlled by the second stepped piston when the control piston approaches either of the stepped pistons. That fluid connection extends through a passage in the smaller end portion of the first stepped piston into the regulator chamber for the second brake circuit. The regulator chamber of the second brake circuit communicates with the wheel cylinder. A closing member is disposed in the passage in the first stepped piston. The closing member has a tappet which projects into the control chamber and can be displaced in its opening direction by the control piston. This embodiment is an extremely compact design which permits a particularly simple, and consequently unexpensive, manufacture.

A further advantage to the device of this invention resides in the design of the closing member to be a one-way valve inhibiting flow in the direction of the control chamber. Thus, the closing member provides that the control chamber will be relieved of fluid pressure after the termination of the brake force so that the sealing elements for the control chamber are only under load as long as the brake is actuated. This prevents the loss of hydraulic fluid which would be inevitable if the control chamber is permanently pressurized.

A further advantage of the device of this invention arises from the fact that the fluid connections of the brake circuits between the brake pressure source and the wheel cylinders can be closed by a valve seat formed at a step of the stepped pistons. The valve seats form a valve connection with an annular sealing member coaxially arranged around each of the stepped pistons. This provides a simple device providing a particularly tight sealing arrangement which interrupts the fluid connections between the brake pressure source and the wheel cylinder without requiring additional moveable members. In the preferred embodiment, a further advantage is obtained by disposing the sealing member so that it seals a bore surrounding each stepped piston and is mounted in the bore so that it may have a limited sliding movement. The sliding movement of the seal member is limited in the direction of the valve seat by a stop and the sliding motion of the sealing member in the direction towards the control chamber is limited by a supporting ring secured to the stepped piston. This is a particularly smooth control device because only minor frictional forces have to be overcome and there is virtually no hysteresis. By virtue of this arrangement, the need for a restoring spring to urge the sealing members into their normal position, which would adversely effect control accuracy, is eliminated. Additional advantages of the brake force regulator constructed in accordance with this invention will become apparent from the features described in the accompanying drawing in which there is an illustration of one embodiment of the brake force regulator of this invention which is particularly compact and easy to manufacture.

DESCRIPTION OF THE PREFERRED EMBODIMENTS

Figure 1:
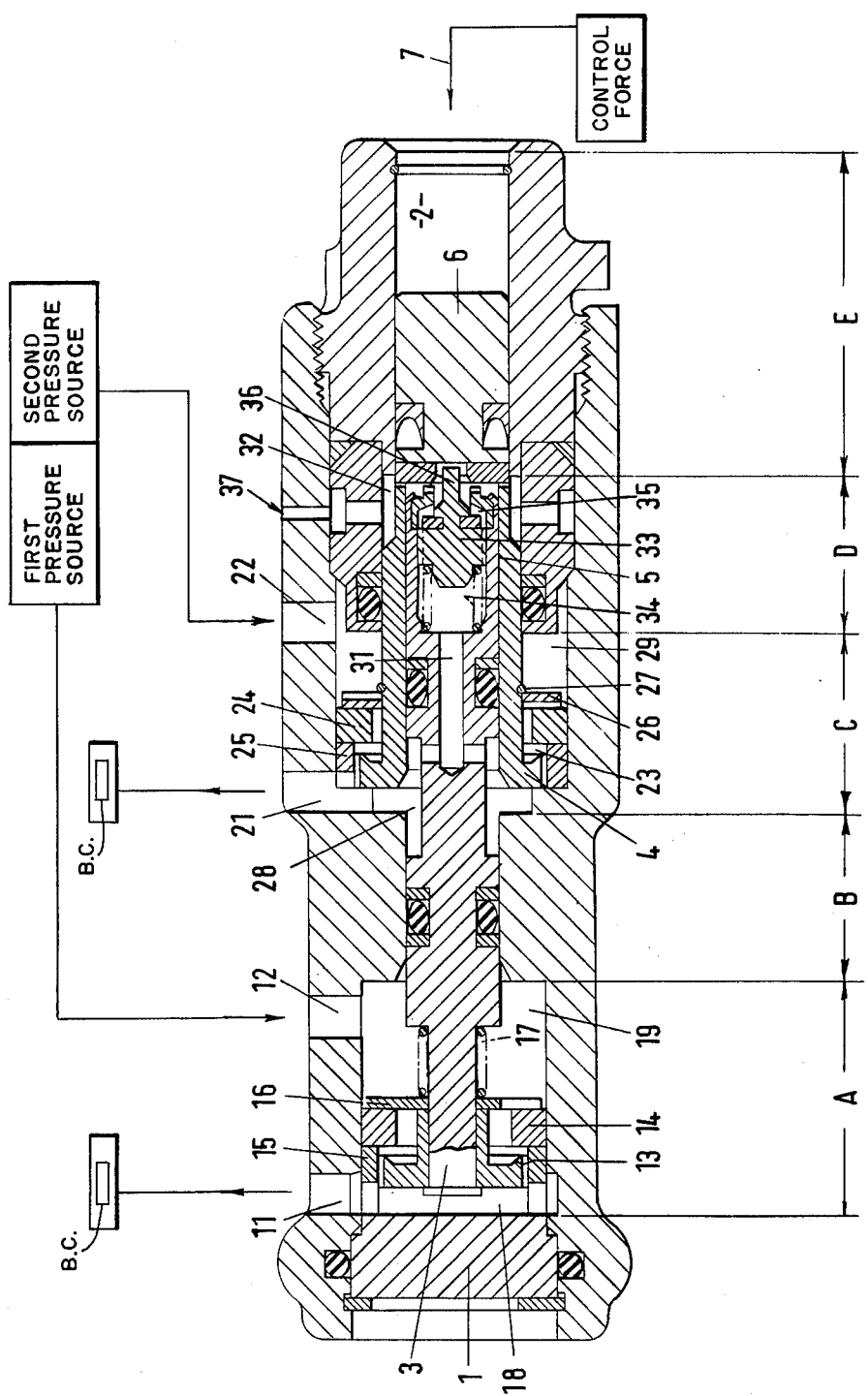
FIG. 1 is a cross-sectional view of an embodiment of the brake force regulator of this invention.

FIG. 1 illustrates a housing 1 which consists of several parts in order to facilitate manufacture and assembly which are interconnected with one another. A central bore 2 is provided throughout the housing 1 and is made up of sections A, B, C, D and E, each of which has a different diameter. Within section A of bore 2, there is provided a first stepped piston 3 which extends throughout sections A, B, C and D. The first stepped piston 3 is slidingly guided by section B of bore 2 and is in a sealing relationship. A second stepped piston 4 is positioned in sections C and D of bore 2. Second stepped piston 4 has a central bore 5 therethrough which receives the smaller end portion of first stepped piston 3 in sections C and D of bore 2 in a sealed sliding relationship.

A control piston 6 arranged coaxially with stepped pistons 3 and 4 is positioned in section E of bore 2. Control piston 6 is moveable axially in section E of bore 2 and is provided with effective seals between control piston 6 and the interior of section E of bore 2.

In order to provide for a better understanding of further description of the elements and operation of the device of this invention it should be noted that the words "right" and "left" as used hereinafter refer to the postion of the elements as shown in FIG. 1. It should be further understood that the terms right and left depend upon the position of the viewer of the device shown in FIG. 1 and will for the sole purpose of designating the relevant positions of the individual members and the functioning of the device as a whole.

Section A of bore 2 has a diameter which is substantially larger than section B of bore 2. The left hand end of the mushroom shaped piston 3 has an annular right hand extending edge surface 13 (hereinafter called leading edge 13). A sealing member 14 is positioned in section A of bore 2. Sealing member 14 slidingly engages and seals section A of bore 2. A stop 15 is provided in section A of bore 2 to limit the movement of sealing member 14 to the left. The displacement of sealing member 14 to the left is caused by a support ring 16 carried on stepped piston 3 and urged to the left by spring 17 which is positioned around stepped piston 3 as illustrated. The supporting ring 16 and the mushroon end of the step piston 3 are arranged so that there is a fluid connection between the right and left sides of section A which remains open so long as the leading edge 13 does not abut the sealing member 14. The right hand end of section A of bore 2 has a fluid inlet port 12 through housing 1 communicating with one of the circuits of the hydraulic brake fluid source under pressure, while the left hand end of section A of bore 2 has a fluid outlet port 11 through housing 1 which communicates with the wheel brake cylinder.

The stepped piston 4 in sections C and D is sleeve shaped. It is provided with a central bore 5 through which extends the smaller end portion of the stepped piston 3 located in sections C and D of bore 2. Stepped piston 4 is similar to stepped piston 3 at its left hand end in that its left hand end has a mushroom shape with an annular extension extending to the right forming a valve edge 23. In section C, of bore 2, there is a sealing member 24 which surrounds the stepped piston 4. The sealing member 24 is slidably positioned in section C of bore 2 and the movement of the sealing member 24 to the left is limited by a stop member 25. On the right hand side of sealing member 24, a support ring 26 acts on sealing member 24 to cause its movement and a circular clip 27 prevents the supporting ring 26 from being displaced on stepped piston 4 to the right. The portion of the stepped piston 4 positioned in section D of bore 2 is guided by a portion of the housing 1 in a sealed relationship and is mounted in section D of bore 2 so that stepped piston 4 is axially slidable.

In order to better understand the mode of operation of the device illustrated in FIG. 1, it should be understood that there is a regulator chamber 18 which extends from the valve edge 13 of stepped piston 3 to the left and an inlet control chamber 19 extending from the valve edge 13 to the right. Both the regulator chamber 18 and the inlet chamber 19 are defined by section A of bore 2. Regulator chamber 18 and inlet chamber 19 are operatively interconnected with a first brake circuit. In section C of bore 2, there is provided a regulator chamber 28 extending from the valve edge 23 of stepped piston 4 to the left and an inlet control chamber 29 extending from the valve edge 23 to the right. Regulator chamber 28 and inlet control chamber 29 are operatively interconnected to a second brake circuit.

It should be understood throughout that the pressure in regulator chamber 18, 28 includes the pressure force fed back thereto by the brake cylinder they are associated with.

In the right hand smaller end portion of stepped piston 3 located in sections C and D a passageway 31 is formed which leads from regulator chamber 28 to the principle control chamber 32 located in section D. Stepped piston 3 is also provided with a closing member 33 positioned in passageway 31 which is biased to the right against the valve seat in the fluid passageway 35 by the spring 34 positioned in the interior of the right hand end of stepped piston 3. A tappet 36 extends to the right from closing member 33 which projects out of stepped piston 3 to the right and supports itself against the control piston 6 when the device of FIG. 1 is in the inoperative postion.

The control chamber 32 is vented in a known manner via opening 37.

The control force identified by the arrow 7 acts on the right hand end of control piston 6. The control force may either be a predetermined biasing force provided by a spring (not shown) or may be a variable force which is responsive to the axle load by appropriate force transmitting means.

The mode of operation of the brake force regulator illustrated in FIG. 1 is as follows in the situation where both brake circuits are intact. In the normal position, prior to brake actuation, the parts are in the position illustrated. Thus there is free flow of braking fluid in section A from the inlet chamber 19 past the valve edge 13 to the regulator chamber 18. Thus, the first brake circuit is in communication through inlet port 12 through inlet chamber 19 past the valve edge 13 through regulator chamber 18 through outlet port 11 to the brake cylinders of the first brake circuit.

Similarly, in section C, there is free flow of braking fluid through inlet port 22 through inlet chamber 29 past the valve edge 23 through the regulator chamber 28 and out through outlet port 21 to the brake cylinders of the second brake circuit. The closing member 33 rests with its tappet 36 against the control piston 6 and the closing member 33 is thus held in the open position so that there is a fluid connection between regulator chamber 28 and the control chamber 32 by passages 31 and 35.

When braking starts each of the circuits feeds braking fluid to inlet chambers 19 and 29 through fluid ports 12 and 22. The fluid from the first brake circuit being fed to fluid inlet port 12 flows from inlet chamber 19 past the valve edge 13 into regulator chamber 18 and out through outlet port 11 in order that it may reach the wheel brake cylinders associated with that brake circuit.

Similarly, the fluid from the second brake circuit is supplied to fluid inlet port 22 flows as indicated through inlet chamber 29 past valve edge 23 into regulator chamber 28 and out through outlet port 21 to reach the wheel brake cylinders associated with the second brake circuit. At the same time in sections C and D of bore 2 fluid flows from the regulator chamber 28 through passageway 31 past the outlet to passageway 35 into control chamber 32.

Once a predetermined charging pressure has been reached in control chamber 32 which pressure depends upon the cross-sectional area of control piston 6 and the control force 7 acting on the control piston 6, the control piston 6 will move to the right reacting against the control force 7. The movement to the right of control piston 6 causes the closing member 33 also to be moved to the right as urged by spring 34. This closes fluid passageway 35 and thus interrupts the connection between the regulator chamber 28 and the control chamber 32. This inhibits further increase of the predetermined pressure caused by the control force 7 in the control chamber 32. If for any reason the predetermined pressure in the control chamber 32 should drop during operation, the control piston 6 will push the closing member 33 open by acting on the tappet 36 which will cause the fluid passageway 35 to be kept open until the predetermined charging pressure is again reached in control chamber 32.

When the full charging pressure has been reached, there are no more mechanical forces acting on stepped pistons 3, 4. Thus when the charging pressure has been reached, the position of the two stepped pistons 3 and 4 depends only on the pressures acted thereon and their associated surfaces.

Thus, the charging pressure present in control chamber 32 acts on the stepped piston 3 to the left. The resultant force is proportional to the control force in a ratio relative to the control force 7 and the effective surface ratio of the stepped piston 3 and the control piston 6 in the control chamber 32. At the same time in section A the pressure from the fluid source applied to inlet chamber 19 through the fluid inlet port 12 always acts to the left on an annular surface of the stepped piston 3. The effective annular surface of stepped piston 3 is predetermined by the diameter of the valve edge 13 less the diameter of section B. The pressure which prevails in the regulator chamber 18 acts on stepped piston 3 to the right against the pressures in both the fluid chamber 19 and the control chamber 32. However, the pressure prevailing in regulator chamber 18 acts on the total left hand mushroom-shaped surface of stepped piston 13 which is determined by the diameter of the valve edge 13. Since the total effective surface of stepped piston 3 present in regulator chamber 18 is larger than the annular surface of stepped piston 3 effective in fluid chamber 19, there is a predetermined relationship between the total force acting on stepped piston 3 which is determined by the effective surfaces present on stepped piston 3. At a particular moment, the stepped piston 3 is balanced. That moment depends on the amount of the charging pressure and also on the control force. At the time that stepped piston 3 is balanced, there is a pressure on both sides of stepped piston 3 which is dependent on the ratio between the effective surface areas of stepped piston 3 in regulator chamber 18 and the effective annular surface area of stepped piston 3 in control chamber 19 as well as the pressure introduced in fluid chamber 19 from its source of fluid pressure. Thus, the pressure of the fluid supplied to the brake wheel cylinder associated with the first circuit through outlet port 11 is a sum of the total pressures present in regulator chamber 18. If there is an increase in pressure from the source of hydraulic pressure in the first circuit, the stepped piston 3 will be displaced to the right in such a manner that valve edge 13 interrupts the fluid connection between chambers 19 and 18. In this process, the valve edge 13 will be lifted off its sealing member 14 by only a small amount which is just enough to permit an amount of fluid to flow to regulator chamber 18. Thus, when the pressure in the system introduced from the fluid pressure source in the first circuit is increasing in fluid chamber 19, the valve edge 13 when lifted off to the member 14 a small amount will alter the pressure in regulator chamber 18 and thus regulate the pressure prevailing in the wheel cylinder so that it is always in the same predetermined ratio relative to the fluid source pressure which prevails in control chamber 19.

It should be noted that it is the state of balance of the stepped piston 3 which determines the switching point. In other words, that point in time at pressure relationship where the regulating process starts. That switching point is predetermined by the force acting on the stepped piston 3 in control chamber 32 which force is less than the actual control force by reason of the hydraulic transmission ratio.

When the fluid source pressure is reduced back towards the switching point, the force acting in fluid chamber 19 on the right hand annular effective surface area of stepped piston 3 will also become less so that the force acting in the regulator chamber 18 on the effective surface area of stepped piston 3 by virtue of the pressure prevailing therein will preponderate thereby shifting the piston together with its removable sealing member 14 to the right such that the pressure in the enlarged regulator chamber 18 remians in the same predetermined ratio relative to the pressure in fluid chamber 19 until the switching point is again reached. Once the pressure in control chamber 19 falls short of the switching point, the valve edge 13 of stepped piston 3 moves again completely away from the sealing member 14 thereby reestablishing the fluid connection between control chamber 19 and regulator chamber 18. Thus, the full fluid source pressure of the first circuit which lies below the switching point pressure is again applied to the wheel's brake cylinder. In this process, the sealing member 14 acts, in the proximity of the switching point pressure, momentarily as a one way valve opening in the direction of fluid chamber 19 and permits the fluid in regulator chamber 18 to flow into fluid chamber 19. Thus, the stepped piston 3 will be displaced to the left in order to return it to its normal position.

The regulation of the second brake circuit by the second stepped piston 4 has a mode of operation which is similar to the first circuit's regulation as described above. In the control chamber 32, a force which is dependent on the charging pressure acts to the left on the left hand annular surface of stepped piston 4. That left hand surface of stepped piston 4 has an effective surface area determined by the diameter of section D and the diameter of bore 5. At the same time, pressure supplied by the second circuit's pressure source prevails in inlet chamber 29 and it also acts on the right hand annular effective surface of stepped piston 4. The effective annular surface on the right hand end of stepped piston 4 is determined by the diameter of bore 5 and diameter of valve edge 23. If properly dimensioned, the diameters of valve edge 23 of section D and bore 5 provides the same control characteristics for the second brake circuit as was described in connection with the operation of stepped piston 3.

It will be readily understood by those skilled in the art that if the diameters of bore 5 and valve edge 23 are altered, it is possible to achieve different control characteristics in the two brake circuits, should that be a desirable result.

In any case, when determining the dimensions of the device, it must be remembered that the diameter of bore 5 corresponds to the diameter of section B in order to avoid the presence of interfering forces acting on the stepped piston 3 in regulator chamber 28. However, if it is desired to influence the control characteristics for the first brake circuit by an additional force created by the regulated pressure in the second circuit the diameters may be different. Similarly, the effective surface in control chamber 32 resulting from the diameter of the control piston 6 must be greater than the effective surface acting in control chamber 32 on the stepped piston 3. Also, the effective surface area of control piston 6, stepped piston 4 in control chamber 32 must also be greater than the effective surface area of stepped piston 4 in control chamber 32, since if these conditions are not fulfilled, the control piston 6 will always rest against one of the stepped pistons 3 or 4.

What follows below is a description of an operation of the elements shown in FIG. 1 in the event that either of the two brake circuits fails. If for example, there is a failure in the second brake circuit, the fluid flow of which passes through section C, the following events will occur. As pressure cannot build up in the second brake circuit, regulator chamber 28 remains unpressurized so that fluid cannot be introduced into control chamber 32 via passage 31 past the closing member 33. Therefore, the necessary charging pressure cannot build up in control chamber 32. The control piston 6 will remain in firm mechanical abutment against the stepped piston 3, thus causing the application of the full control force 7 to the left. The control force 7 is greater than the force created by the charging pressure from the first circuit which normally acts on stepped piston 3. The force acting on stepped piston 3 resulting from the pressures in control chamber 19 and regulator chamber 18 are dependent upon the pressure of the first circuit's fluid pressure source. Since there is an additional increased control force 7 acting on stepped piston 3, stepped piston 3 reaches its balanced condition, and thus the switching point, only if the pressure from the first circuit's fluid pressure source is higher than would be the case if both brake circuits were intact. Since this must be the case, the pressure of the fluid fed to the wheel's brake cylinder associated with the first circuit must be higher than would be the case if both brake circuits were intact. Thus the pressure fed to the wheel's brake cylinder associated with the first circuit will be regulated only at a higher pressure. Once the higher switching point has been reached the pressure in the regulator chamber 18 will be reduced relative to the pressure in fluid chamber 19 in the same ratio as applicable to the case of both brake circuits being intact. The control is therefore completely normal in the case of failure of the second brake circuit except that the switching point pressure in the first circuit has been increased. It should be noted that the second stepped piston 4 has no influence on the control as there are no forces acting on it because of the failure of the second brake circuit.

If the first brake circuit fails, the operation of the device illustrated in FIG. 1 is as follows. The brake fluid pressure in the second brake circuit is present in inlet chamber 29 by the passage of fluid through fluid inlet port 22 permitting flow past the valve edge 23 to regulator chamber 28. From regulator 28, the fluid is led to the wheel's brake cylinders associated with the second brake circuit. At the same time, there is flow through passage 31 past the closing member 33 and into control chamber 32. However, since there are no forces acting on the first stepped piston 3 in section A, because of failure of the first brake circuit, the first stepped piston 3 will move to the left at an extremely slight pressure. The effect of spring 17 may be disregarded since its force is very small, the amount of force it provides being only that necessary to restore the sealing member 14 adjacent the valve edge 13. The purpose of spring 17 will be better understood by understanding that if supporting ring 16 were to be secured by a circle clip the displacement of the stepped piston 3 to the left, which is important in the functioning of the system as a brake force distributor in the event of failure of the first brake circuit, would not be possible. Thus, in that case, the effect of spring 17 comes to bear, permitting the displacement of the stepped piston 3 to the left without its being prevented from doing so to support ring 16.

Since the displacement of stepped piston 3 to the left takes place at low pressures in the second brake circuit, the closing member 33 will not be held in the open position by the control piston 6 acting thereon through tappet 36. Closing member 33 therefore will close passage 31 at the fluid passageway 35 thus interrupting the connection between regulator chamber 28 and the control chamber 32. However, since the stepped piston 3 can move further to the left with very little effort, the control piston 6 mechanically supports itself against the right hand end of stepped piston 4, thus bringing to bear the full control force against the second stepped piston 4. Thus the functioning of the second brake circuit's elements will occur in the same manner as the first circuit's elements as described above. In other words, there is at first a higher switching point pressure for the still intact second brake circuit, followed by normal regulation.

It will be readily understood from the above that with both brake circuits intact, the control force 7 is reduced in acting on stepped pistons 3 and 4 in the opening direction of the brake force regulator by reason of the preselected hydraulic transmission ratio between the control piston 6 and the stepped pistons 3, 4. Should, however, either of the brake circuits fail, the brake force regulator of FIG. 1 is designed so as to provide that the hydraulic transmission ratio of the control force from the control piston 6 to the stepped pistons 3, 4 becomes ineffective so that the full control force acts mechanically only on the stepped piston 3 or 4 associated with the intact brake circuit. Additionally, as it has been described above, the device of FIG. 1 provides for an increased switching point pressure in the event of the brake circuit failure, which increased pressure is determined by the effective surface areas ratio of the stepped pistons and the amount of control force. The normal switching point pressure is in effect if the brake circuits are fully intact and can be freely selected by appropriately dimensioning the ratio of the surfaces between the stepped pistons 3, 4 and the control piston 6. As has been pointed out, it is possible to have different control characteristics from two brake circuits by altering the effective surface ratios of the stepped pistons, 3, 4 and the control piston 6.

By arranging the two stepped pistons 3, 4 and the control piston 6 coaxially, with the smaller end portion of the first stepped piston projecting into the control chamber 32 through the bore 5 in the second stepped piston 4, there is also provided a fluid connection between the control chamber 32 and the brake circuit controlled by step piston 4 that connection is opened when the control piston 6 approaches one of the stepped pistons 3, 4 extends through passage 35 in the smaller right hand end portion of the first stepped piston 3 through passageway 31 to the regulator chamber 28 of the second brake circuit which is the regulator chamber for the wheel's brake cylinders associated with the second brake circuit. Also the closing member 33 is provided with a tappet 36 which projects into the control chamber 32 and can be displaced in the opening direction between control piston 6. This interrelationship of the parts provides an extremely compact device which is simple and inexpensive to manufacture.

Other advantages obtained with the device illustrated in FIG. 1 include the design of the closing member 33 which acts as a one-way valve to inhibit flow in the direction of the control chamber 32. Furthermore, the control chamber 32 in the device illustrated in FIG. 1 is fluid relieved through outlet 37 after termination of the braking effort so that the seals sealing the control chamber 32 are only under load for so long as the brake is actuated. The provision for fluid pressure relief of the control chamber avoids the loss of hydraulic fluid which would be inevitable if the control chamber 32 were to be permanently pressurized.

A further advantage of the device illustrated in FIG. 1 is that the hydraulic fluid connections of the two brake circuits between the brake pressure source and the wheel cylinder can be closed by the valve edges 13, 23 formed at the larger steps of each of the stepped pistons 3, 4. Each of the valve edges 13, 23 forms a valve seat when mated with an annular sealing member 14, 24 which are coaxially arranged about each of the stepped pistons 3, 4. This provides an extremely simple method of providing a particularly tight sealing arrangement to interrupt the fluid connections between the brake pressure source and the wheel cylinder without necessitating any additional moving members. It is a further advantage of the device illustrated in FIG. 1 that each of the sealing members 14, 24 not only seals but it is slidable in a bore which surrounds the stepped pistons 3, 4 with the sliding movement being limited in the direction of the valve edges 13, 23 by stops 15, 25.

Furthermore, the sliding motion of the sealing members 15, 25 in the direction of the control chamber 32 is limited by supporting rings 16, 26. The combination of elements thus provides a particularly smooth control since there are only minor frictional forces which have to be overcome and therefore very little hysteresis effect. Accordingly, there is no need for restoring springs to urge sealing members 14, 24 back to their normal positions. This is particularly important since the utilization of such restoring springs could adversely effect the control accuracy.

A further advantage can be obtained if each of the sealing members 14, 24 is made from an elastic material preferably a plastic material.

It should be understood by those of skill in the art that the scope of this invention is not limited to the particular embodiment illustrated and described hereinabove. The invention may be embodied in other specific forms without departing from the spirit and scope of the invention as defined in the appended claims.

What is claimed is:

1. A brake force regulator for a dual circuit brake system having first and second brake circuits including first and second brake pressure sources connected to at least one first and second wheel brake cylinders associated with each of said first and second circuits through said brake force regulator;

means for providing a control force operatively connected to said brake force regulator;

said brake force regulator including: a housing having an axially extending bore formed therein and having inlet ports operatively connected to each of said brake pressure sources and outlet ports operatively connected to each of said wheel brake cylinders associated with each of said circuits;

a first axially displaceable stepped piston positioned in a portion of the bore of said housing having a larger end face portion and a smaller end face portion, said first stepped piston being positioned for sealed sliding movement in the bore of said housing, including a means forming a first fluid connection in said first brake circuit between said first brake pressure source and said at least one wheel brake cylinder associated with said first brake circuit, means for applying pressure to one side of said larger end face portion of said first stepped piston supplied by said first brake pressure source and for applying said control force to said smaller end face portion, both said first brake pressure and said control force acting on said first stepped piston in the direcion toward opening said first fluid connection, and means for exposing the other side of said larger end face portion of said first stepped piston to the pressure in the fluid supplied to said at least one wheel brake cylinder acting on said first stepped piston in the direction towards closing said first fluid connection;

a second axially displaceable stepped piston positioned in a portion of the bore of said housing having a larger end face portion and a smaller end face portion, said second stepped piston being positioned for sealed sliding movement in the bore of said housing, including a means forming a second fluid connection in said second brake circuit between said second brake pressure source and said at least one wheel brake cylinder associated with said second brake circuit, means for applying pressure to one side of said larger end face portion of said second stepped piston supplied by said second brake pressure source and for applying said control force to said smaller end face portion, both said second brake pressure and said control force acting on said second stepped piston in the direction toward opening said second fluid connection, and means for exposing the other side of said larger end face portion of said second stepped piston to the pressure in the fluid supplied to said at least one wheel brake cylinder acting on said second stepped piston in the direction towards closing said second fluid connection;

a control piston arranged in said housing;

means causing said control force to act on one end face of said control piston;

said housing including a control chamber in said bore, the ends of said control chamber being formed by the smaller end faces of said stepped pistons on one side and by the other end face of said control piston on the other side;

a first fluid passage formed internally in the smaller end of said first stepped piston extending from said control chamber to said second fluid connection of said second brake circuit, means in said first passage for opening and closing said first passage operated on by said control piston when said control piston abuts the smaller end of said first stepped piston; and each of said stepped piston's smaller end faces having an effective surface area acted on by the pressure of the fluid in said control chamber which is a smaller effective surface area than the effective surface area of said control piston's said other face.

2. The brake force regulator of claim 1 wherein said stepped pistons and said control piston are arranged coaxially in said housing with said smaller end portion of said first stepped piston projecting in a sealed axially moveable relationship into said control chamber through a bore formed in said second stepped piston.

3. The brake force regulator of claim 1 wherein said first passage between said control chamber and said brake circuit controlled by the said second stepped piston extends through a second passage in the said smaller end portion of said first stepped piston when said first passage is opened to a chamber in said housing on said other side of said larger end face portion of said second stepped piston in communication with the wheel brake cylinders associated with said second brake circuit, a closing member disposed in said second passage having a tappet portion which projects into said control chamber towards said other face of said control piston and is displaced in the opening direction by said control force acting through said control piston.

4. The brake force regulator of claim 3, wherein said closing member is a one-way valve arranged to inhibit flow from said chamber associated with said second stepped piston to said control chamber.

5. The brake force regulator of claim 1 wherein each of said stepped pistons includes means for closing the fluid connections provided by said stepped pistons between the brake pressure force and the wheel cylinders including a valve edge formed adjacent the larger end of each of the stepped pistons.

6. The brake force regulator of claim 5 which further includes an annular sealing member coaxially arranged in said housing adjacent each of said stepped pistons co-operating with said valve edges to form seating valves to provide said fluid connection closure.

7. The brake force regulator of claim 6 wherein each of said sealing members is axially moveable in the bore of said housing at a position adjacent said stepped pistons and stop means carried in said bore of said housing positioned so as to limit the axial movement of each of said sealing members in the direction of movement of members toward each of said valve edges.

8. The brake force regulator of claim 7 which further includes a supporting ring secured to each of said stepped pistons at a position in relation to said sealing members on the side thereof opposite to the side of said sealing members which contact said valve edges, said supporting rings limiting the axial movement of said sealing members in the direction opposite to the movement of said sealing members into contact with said valve edges.

9. The brake force regulator of claim 6 wherein said annular sealing members are formed from an elastic plastic material.

10. A brake force regulator for an automotive dual circuit brake system having first and second brake circuits comprising:

housing means;

an axially extending bore formed through said housing forming a plurality of chambers;

a first stepped piston positioned in said bore extending from a first chamber through a reduced diameter second chamber and a third chamber to a fourth chamber, said first stepped piston being supported in said second chamber in a sealed axially moveable relationship at an intermediate portion thereof;

a second stepped piston in said third and fourth chambers supported in a sealed axially moveable relationship with the bore of said housing, said second stepped piston having a central bore formed therethrough for receiving the portions of said first stepped piston extending in said third and said fourth chambers in a sealed axially moveable relationship;

a control piston positioned in a fifth chamber formed in said housing in a sealed relationship therewith adapted to be acted on by a control force to transmit the control force through said control piston to one end of each of said stepped pistons;

each of said stepped pistons having means on their other ends to divide said first and third chambers, respectively into an inlet chamber and a regulator chamber, each of said inlet chambers and regulator chambers having inlet means and outlet means associated with one of said brake circuits and each of said stepped pistons including a valve edge extending towards said control piston;

axially moveable sealing means in said first and third chambers positioned about each of said stepped pistons adapted to form a valve seat with each of the valve edges on said stepped pistons and being adapted to close off communication between each inlet chamber and each regulator chamber by said sealing member and valve edge;

supporting rings carried by said stepped pistons arranged to prevent axial movement of said sealing members in the direction opposite to their sealing engagement with said valve edges;

stop means carried by the bore in said housing positioned opposite and spaced from the portions of said stepped pistons which carry said valve edges and arranged to prevent said sealing member from axially moving beyond a fixed position towards said valve edges; and a control chamber, formed in said housing between the one of each of the ends of said stepped pistons and the inner end of said control piston, including a fluid connection means extending from a regulator chamber for said second brake circuit through a passageway in the portion of said first stepped piston in said third and fourth chambers, said passageway in said first stepped piston further includes a closing means positioned therein adapted to act as a one-way valve to inhibit flow from said regulator chamber associated with said second brake circuit to said control chamber.

* * * * *